United States Patent
Jacobsen

(10) Patent No.: US 12,001,219 B2
(45) Date of Patent: Jun. 4, 2024

(54) DETECTING OBJECTS NEAR AN AUTONOMOUS DEVICE

(71) Applicant: MOBILE INDUSTRIAL ROBOTS A/S, Odense SØ (DK)

(72) Inventor: Niels Jul Jacobsen, Odense (DK)

(73) Assignee: MOBILE INDUSTRIAL ROBOTS A/S, Odense Soe (DK)

( * ) Notice: Subject to any disclaimer, the term of this patent is extended or adjusted under 35 U.S.C. 154(b) by 34 days.

(21) Appl. No.: 17/161,977

(22) Filed: Jan. 29, 2021

(65) Prior Publication Data

US 2021/0223786 A1    Jul. 22, 2021

Related U.S. Application Data

(62) Division of application No. 16/009,414, filed on Jun. 15, 2018, now abandoned.

(51) Int. Cl.
    *G05D 1/02* (2020.01)
    *G05D 1/00* (2006.01)

(52) U.S. Cl.
    CPC ......... *G05D 1/0246* (2013.01); *G05D 1/0088* (2013.01); *G05D 1/0242* (2013.01); *G05D 1/0259* (2013.01)

(58) Field of Classification Search
    CPC .. G05D 1/0246; G05D 1/0259; G05D 1/0242; G05D 1/0088
    See application file for complete search history.

(56) References Cited

U.S. PATENT DOCUMENTS

| | | |
|---|---|---|
| 5,983,161 A | 11/1999 | Lemelson et al. |
| 6,459,955 B1 | 10/2002 | Bartsch et al. |
| 9,606,544 B2 | 3/2017 | Gariepy et al. |
| 9,663,025 B2 | 5/2017 | Drexler et al. |
| 9,746,852 B1 * | 8/2017 | Watts ................... G05D 1/0248 |
| 9,891,630 B2 | 2/2018 | Gariepy et al. |

(Continued)

FOREIGN PATENT DOCUMENTS

| | | |
|---|---|---|
| CN | 101532934 | 9/2009 |
| CN | 112744224 | 5/2021 |

(Continued)

OTHER PUBLICATIONS

Action and Response History for U.S. Appl. No. 16/009,414 (dated Jul. 19, 2023), 24 pages.

(Continued)

*Primary Examiner* — Ramsey Refai
(74) *Attorney, Agent, or Firm* — Burns & Levinson LLP

(57) ABSTRACT

An example autonomous device is configured to detect objects within a vicinity of the autonomous device. The autonomous device is configured to move along a surface. The autonomous device includes a body, at least one long-range sensor on the body configured for detection in a first field, and at least one short-range sensor on the body. Each short-range sensor is configured for detection in a second field directed towards the surface. The second field is smaller than the first field. Each short-range sensor is configured to output signals based on detection of an object within the second field. A control system is configured to control movement of the autonomous device based, at least in part, on the signals.

18 Claims, 7 Drawing Sheets

(56) References Cited

U.S. PATENT DOCUMENTS

| | | | |
|---|---|---|---|
| 9,918,605 | B2 | 3/2018 | Wolfe et al. |
| 9,963,155 | B2* | 5/2018 | Gariepy ............... G05D 1/0066 |
| 10,585,440 | B1* | 3/2020 | Gariepy .................... B66F 9/24 |
| 10,668,617 | B2 | 6/2020 | Jacobsen |
| D907,677 | S | 1/2021 | Mork et al. |
| 10,916,029 | B2 | 2/2021 | Kabel et al. |
| D929,478 | S | 8/2021 | Mork et al. |
| 11,136,744 | B2 | 10/2021 | Myers et al. |
| 11,247,672 | B2 | 2/2022 | Wieschemann et al. |
| 2005/0206231 | A1 | 9/2005 | Lu et al. |
| 2005/0209762 | A1 | 9/2005 | Lu et al. |
| 2011/0196623 | A1 | 8/2011 | Hakkinen |
| 2013/0085649 | A1 | 4/2013 | Matoy et al. |
| 2014/0088761 | A1 | 3/2014 | Shamlian et al. |
| 2014/0110183 | A1 | 4/2014 | Rudakevych et al. |
| 2014/0278041 | A1 | 9/2014 | Brenninger |
| 2015/0362921 | A1 | 12/2015 | Hanaoka et al. |
| 2016/0236347 | A1 | 8/2016 | Taku et al. |
| 2016/0377508 | A1 | 12/2016 | Perrone et al. |
| 2017/0031366 | A1 | 2/2017 | Shamlian et al. |
| 2017/0038776 | A1 | 2/2017 | Gariepy et al. |
| 2017/0008085 | A1 | 3/2017 | Drexler et al. |
| 2017/0072558 | A1* | 3/2017 | Reynolds .............. G05D 1/0246 |
| 2017/0080850 | A1 | 3/2017 | Drexler et al. |
| 2017/0182459 | A1 | 6/2017 | Klidas et al. |
| 2017/0197643 | A1 | 7/2017 | Gariepy et al. |
| 2017/0232885 | A1 | 8/2017 | Drexler et al. |
| 2017/0291315 | A1 | 10/2017 | Wise |
| 2017/0344009 | A1* | 11/2017 | Wernersbach ....... G05D 1/0011 |
| 2018/0075619 | A1 | 3/2018 | Kabel et al. |
| 2018/0281178 | A1 | 10/2018 | Jacobsen |
| 2019/0384314 | A1 | 12/2019 | Jacobsen |
| 2020/0004247 | A1 | 1/2020 | Jacobsen et al. |
| 2020/0108811 | A1 | 4/2020 | Wijffels et al. |
| 2020/0159238 | A1 | 5/2020 | Jacobsen et al. |
| 2021/0208592 | A1 | 7/2021 | Jacobsen |
| 2021/0223786 | A1 | 7/2021 | Jacobsen |
| 2023/0020966 | A1 | 1/2023 | Foster |

FOREIGN PATENT DOCUMENTS

| | | |
|---|---|---|
| DE | 102017103097 | 8/2018 |
| EP | 3167784 A1 | 5/2017 |
| JP | H086640 | 1/1996 |
| WO | 2013043969 | 3/2013 |
| WO | 20160165721 A1 | 10/2016 |
| WO | WO-2016/165721 A1 | 10/2016 |
| WO | 201700004524 A1 | 1/2017 |
| WO | 2017050358 | 3/2017 |
| WO | 2018149789 | 8/2018 |
| WO | 2020023660 | 1/2020 |
| WO | 2020023665 | 1/2020 |

OTHER PUBLICATIONS

Action and Response History for U.S. Appl. No. 14/883,698 (dated Jul. 19, 2023), 49 pages.

Action and Response History for U.S. Appl. No. 17/275,736 (dated Jul. 19, 2023), 28 pages.

Automotivedictionary.org, "Lateral Acceleration meaning," [online] URL: https://automotivedictionary.org/lateral_acceleration (visited Jul. 12, 2023), 3 pages.

Blizzard, Classic games, Warcraft: Orcs & Humans (1994). [Online] URL: http//us.blizzard.com/en-us/ games/legacy. [Last accessed Dec. 26, 2017], 1 page.

Dixon et al., Mobile Robot Navigation, Final Report, Imperial College, London, (Jun. 10, 1997). [Online]. URL: http://www.doc.ic.ac.uk/-nd/surprise_97/journal/vol4/jmd/. [Accessed Jun. 22, 2017], 27 pages.

DOS Games Archive, Warcraft 11: Tides of Darkness, (1995). [Retrieved Online Aug. 15, 2018]. URL: http//image.dosgamesarchive.com/screenshots/war2_06.png, 1 page.

Expomondo, EXPO 2000, Themenpark & Aubengelande, Deutschland, Holtmann International, (2000). [Online]. URL: http://expomondo.it/expo.html, 4 pages.

Ferzkopp.net, 2000. [Retrieved Online Aug. 15, 2018] URL: http//www.ferzkopp.net/MediaAndArt/Expo2000/ Softwaremodule.gif, 1 page.

MIR 100 User Guide, Mobile Industrial Robots, A/S. Odense, SO. (Nov. 2017). V. 1.0, (pp. 1-37). 39 pages.

MIR 100 User Guide. Mobile Industrial Robots A/S. Odense, SO. (Aug. 2018). V. 1.1, (pp. 1-42). 44 pages.

Mobile Industrial Robots, MiRFleet, Reference Guide, v.1.0, 32 pages (Jan. 2017).

Nedelea, A., "Hyundai's Future Augmented Reality Looks Pretty Cool," (Jan. 1, 2015). [Retrieved Online Aug. 15, 2018]. URL: http://www.carscoops.com/2015/01/hyundais-future-augmented-reality-looks/, 6 pages.

Russell, Roger, "roger-russell.com," 2004. [Online] URL: http://web.archive.org/web/20050404140115/http://www. roger-russell.com/project/project.htm. [Retrived Aug. 20, 2018], 11 pages.

Seat.com, "Lateral acceleration," [online] URL: https://www.seat.com/car-terms/l/lateral-acceleration#:~:text=Lateral%20acceleration%20acts%20transversely%20to,the%20outside%20of%20the%20bend. (visited Jul. 12, 2023), 1 page.

Shenton, Collectable Clocks, Illustration 306, Projection Clock/ Night Clock (1909). [Online], URL: http://web. archive.org/web/20041012014240/http://www.mueller- maerki.com:80/h-niteclk.html. [Retrieved Aug. 20, 2018], 5 pages.

Wikipedia, "Understeer and Oversteer," [online] URL: https://en.wikipedia.org/w/index.php?title=Understeer_and_oversteer&oldid=1153254219 (Jul. 2023), 3 pages.

Zentrum fur Kunst und Medientechnologie (ZKM), Knowledge, Information, Communication Swarming with robots, EXPO 2000 Hannover GmbH (2000). [Online]. URL: http://site.expo2000.de/expo2000/englisch/themenpoark/ frame_wissen_e.html, 2 pages.

International Search Report for PCT/EP2019/065766, 4 pages (dated Sep. 23, 2019).

Written Opinion for PCT/EP2019/065766, 5 pages (dated Sep. 23, 2019).

Communication pursuant to Article 94(3) dated Nov. 8, 2021, European App. No. 18194300.2 (5 pages).

International Search Report dated Nov. 11, 2019, International Application No. PCT/EP2019/073819 (4 pages).

Written Opinion dated Nov. 11, 2019, International Application No. PCT/EP2019/073819 (6 pages).

\* cited by examiner

DETECTING OBJECTS NEAR AN AUTONOMOUS DEVICE

This application is a divisional of U.S. patent application Ser. No. 16/009,414, which was filed on Jun. 15, 2018. The benefit of priority is hereby claimed to U.S. patent application Ser. No. 16/009,414. U.S. patent application Ser. No. 16/009,414 is incorporated herein by reference.

TECHNICAL FIELD

This specification relates generally to an autonomous device configured to detect objects within a vicinity of the autonomous device.

BACKGROUND

Autonomous devices, such as mobile robots, include sensors, such as scanners or three-dimensional (3D) cameras, to detect objects in their path or in their vicinity. These sensors have a limited field of view. As a result, autonomous devices may be unable to detect objects in their immediate vicinity. For example, sensors on an autonomous device may be unable to detect objects close to the ground and near to the autonomous device, particularly at its corners. This can be problematic, especially in a manufacturing environment where ground-level objects, such as forklifts, can move into the path of the autonomous device.

SUMMARY

An example autonomous device is configured to detect objects within a vicinity of the autonomous device. The autonomous device is configured to move along a surface. The autonomous device includes a body, at least one long-range sensor on the body configured for detection in a first field, and at least one short-range sensor on the body. Each short-range sensor is configured for detection in a second field directed towards the surface. The second field is smaller than the first field. Each short-range sensor is configured to output signals based on detection of an object within the second field. A control system is configured to control movement of the autonomous device based, at least in part, on the signals. The autonomous device may include one or more of the following features, either alone or in combination.

The at least one short-range sensor may comprise proximity sensors. The at least one short-range sensor may comprise near-field sensors. The autonomous device may be, or include, a mobile robot.

The body may comprise one or more corners. A group of short-range sensors may be arranged at each corner so that second fields of at least some of the short-range sensors in each group overlap at least in part. There may be four or more short-range sensors arranged at each of the four corners so that second fields of adjacent short-range sensors among the four or more short-range sensors overlap at least in part. Each corner may comprise an intersection of two edges. Each edge of each corner may comprise three short-range sensors. Adjacent ones of the three short-range sensors may have second fields that overlap at least in part.

The body may have a circular perimeter. Short-range sensors may be arranged along the circular perimeter so that second fields of at least some of the short-range sensors overlap at least in part. The body may have a curved perimeter. Short-range sensors may be arranged along the curved perimeter so that second fields of at least some the short-range sensors overlap at least in part.

The body may comprise a top part and a bottom part. The bottom part may be closer to the surface during movement of the autonomous device than the top part. Short-range sensors may be located on the body closer to the top part than to the bottom part. At least one short-range sensor may be located adjacent to the top part.

The at least one short-range sensor on the body may be angled towards the surface such that a second field of the at least one short-range sensor is directed towards the surface. A horizontal plane extends from the body at 0°, and the surface is at −90° relative to the horizontal plane. Short-range sensors may be directed towards the surface such that the second field of at least some of the short-range sensors is between −1° and −90° relative to the horizontal plane. Short-range sensors may be directed towards the surface such that the second field of all of the short-range sensors is between −1° and −90° relative to the horizontal plane.

The at least one short-range sensor may be configured to output signals in response to detecting the object. The at least one short-range sensor may be configured to use non-visible light to detect the object. The at least one short-range sensor may be configured to use infrared light to detect the object. The at least one short-range sensor may be configured to use electromagnetic signals to detect the object. The at least one short-range sensor may comprise photoelectric sensors.

Each second field may be 30 centimeters (cm) in diameter at most. Each second field may be 20 centimeters (cm) in diameter at most.

The body may include corners. A group of short-range sensor may be arranged at each of the corners. Adjacent ones of the short-range sensors may have second fields that overlap at least in part such that, for a corner among the corners, there are no blind spots for the autonomous device in a partial circumference of a circle centered at the corner. The autonomous device may include a bumper that is comprised of an elastic material. The bumper may be around at least part of a perimeter of the autonomous device. The at least one short-range sensor may be located underneath the bumper. Sensors may be arranged around at least part of a perimeter of the body.

Short-range sensors may be directed towards the surface on which the device travels such that a second field of each short-range sensor extends at least from 15 centimeters (cm) above the surface to the surface.

An example autonomous device is configured to detect objects within a vicinity of the autonomous device. The autonomous device includes a body for supporting weight of an object, wheels on the body to enable the body to travel across a surface, and a camera on the body to obtain images in front of the autonomous device. The camera has first field that extends from the body. Sensors may be disposed along at least part of a perimeter of the body. The sensors may have a second field that extends from the surface to at least a location below the first field. The autonomous device may be, or include, a mobile robot. The autonomous device may include one or more of the following features, either alone or in combination.

The second field may intersect the first field in part. At least two of the sensors that are adjacent to each other may have fields that overlap at least partly. The sensors may be configured to use non-visible light to detect an object. The sensors may be configured to use infrared light to detect an object. The sensors may be configured to use electromagnetic signals to detect an object. The sensors may comprise photoelectric sensors. The sensors may comprise proximity sensors configured to sense an object within at most 20 centimeters. The sensors may comprise proximity sensors configured to sense an object within at most 30 centimeters.

The body may comprise one or more corners. At least one of the corners may be defined by edges that support a group of the sensors. The group of sensors may have fields that overlap at least in part such that, for the at least one corner, there are no blind spots for the autonomous device in a partial circumference of a circle centered at the at least one corner. The autonomous device may include a rubber bumper along at least part of the perimeter. The sensors may be underneath the rubber bumper.

Any two or more of the features described in this specification, including in this summary section, can be combined to form implementations not specifically described herein.

The systems and processes described herein, or portions thereof, can be controlled by a computer program product that includes instructions that are stored on one or more non-transitory machine-readable storage media, and that are executable on one or more processing devices to control (e.g., coordinate) the operations described herein. The systems and processes described herein, or portions thereof, can be implemented as an apparatus or method. The systems and processes described herein can include one or more processing devices and memory to store executable instructions to implement various operations.

The details of one or more implementations are set forth in the accompanying drawings and the description below. Other features and advantages will be apparent from the description and drawings, and from the claims.

DESCRIPTION OF THE DRAWINGS

Like reference numerals in different figures indicate like elements.

DETAILED DESCRIPTION

Described herein are examples of autonomous devices or vehicles, such as a mobile robot. An example autonomous device (or simply "device") is configured to move along a surface, such as the floor of factory. The example device includes a body for supporting the weight of an object and wheels on the body to enable the body to travel across the surface. The example device includes long-range sensors on the body configured for detection in a first field of view (FOV) or simply "field". For example, the device may include a three-dimensional (3D) camera that is capable of detecting an object within its FOV. The example device also includes short-range sensors on the body. Each short-range sensor may be configured for detection in a second FOV that is smaller than, or different from, the FOV of each long-range sensor. The short-range sensors may include near-field sensors or proximity sensors for detecting within the second FOV. The second FOV may be directed toward the surface to enable detection of objects in the immediate vicinity of the device. For example, the short-range sensors may be configured to detect objects close to the ground and near to the device, particularly at its corners. Each short-range sensor may be configured to output signals based on—for example, in response to—detection of an object within its FOV. A control system may be configured to control movement of the device based, at least in part, on those signals. The control system may be, or include, one or more processing devices, such as a microprocessor. The control system can also include computing resources distributed to a remote—for example, a cloud—service and, therefore, the control system need not be on-board the robot. In response to detection of the object, the control system may take appropriate action, such as changing the device's path or stopping movement or other operation of the robot.

The following description includes values relating to sensor parameters, such as FOV. These values are examples only. Different sensors may have different values, and different devices may use different types, numbers, or configurations of sensors.

Figure 1:
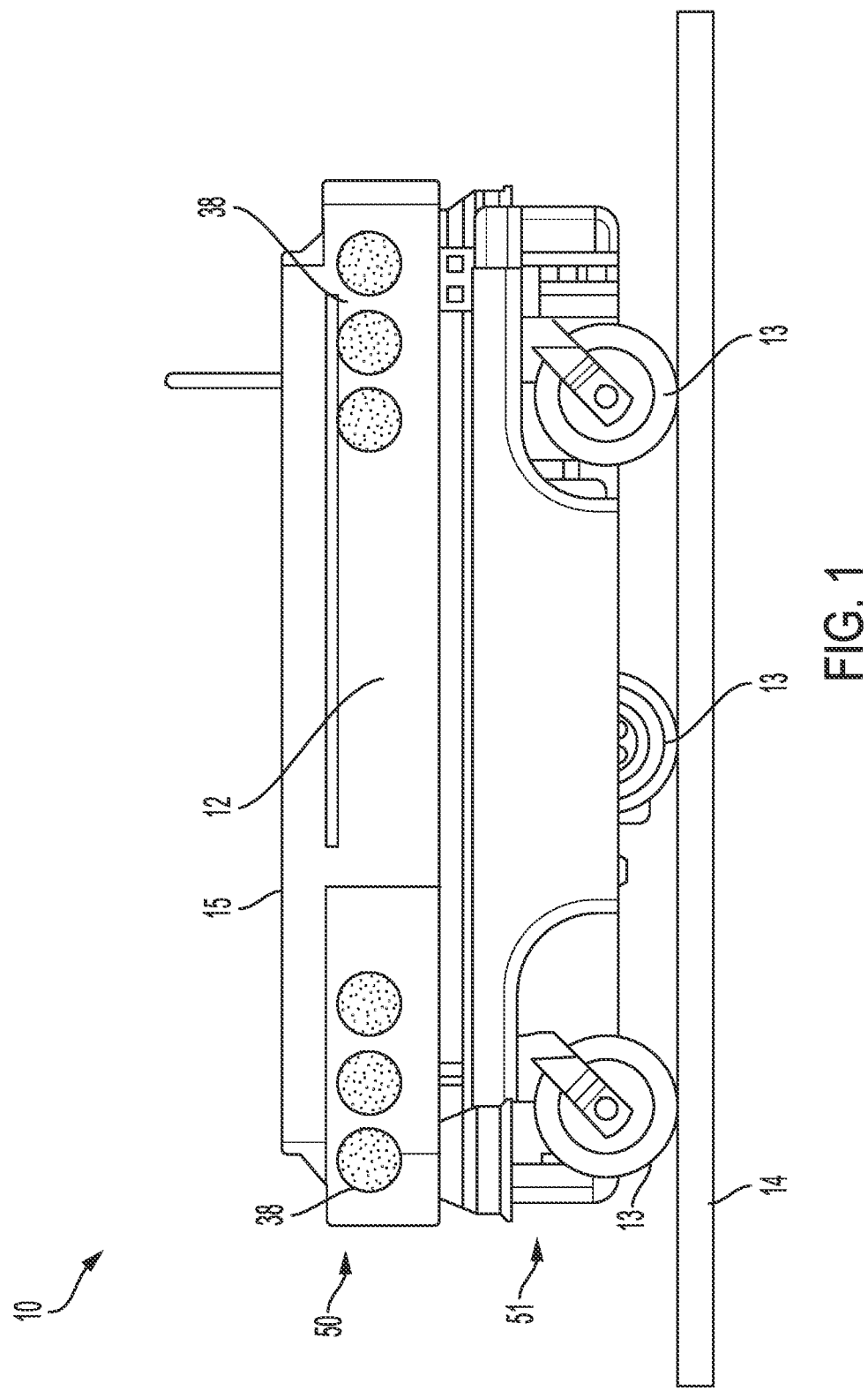
FIG. 1 is a side view of an example autonomous robot.

An example of an autonomous device is autonomous robot 10 of FIG. 1. In this example, autonomous robot 10 is a mobile robot, and is referred to simply as "robot". Robot 10 includes a body 12 having wheels 13 to enable robot 10 to travel across a surface 14, such as the floor of a factory or other terrain. Robot 10 also includes a support area 15 configured to support the weight of an object. In this example, robot 10 may be controlled to transport the object from one location to another location. Robot 10 includes a sensor configuration of the type described herein. However, the sensor configuration is not limited to robots of this type. Rather, the sensor configuration may be used with any appropriate type of autonomous device, robot, or vehicle.

In this example, robot 10 includes two types of long-range sensors: a three-dimensional (3D) camera and a light detection and ranging (LIDAR) scanner. However, the robot is not limited to this configuration. For example, the robot may include a single long-range sensor or a single type of long-range sensor. For example, the robot may include more than two types of long-range sensors.

Figure 2:
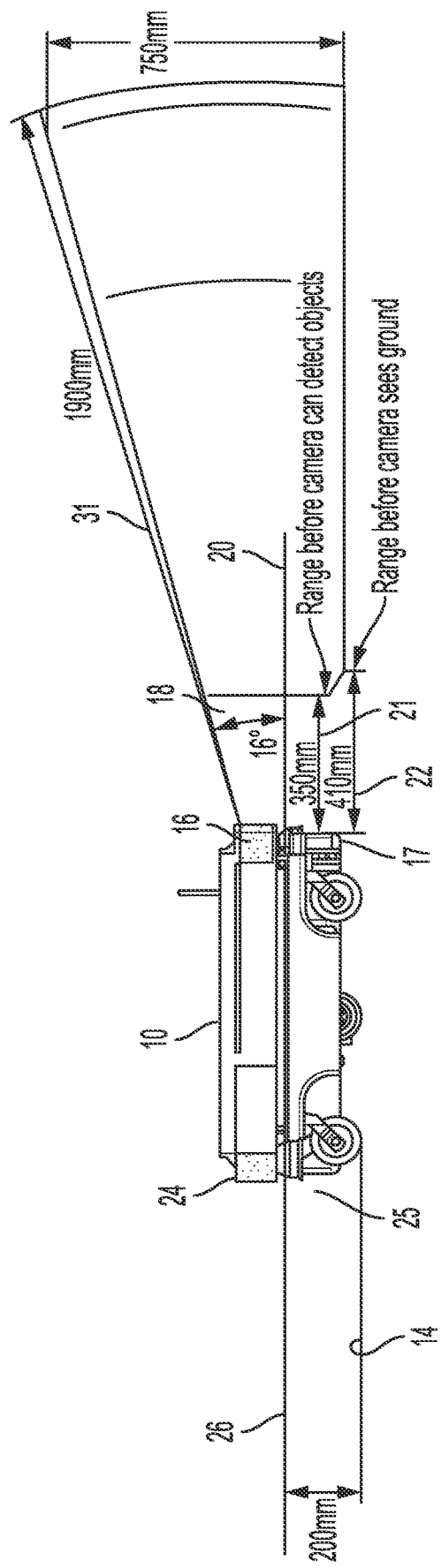
FIG. 2 is a side view of the example autonomous robot, which shows ranges of long-range sensors included on the robot.

Referring to FIG. 2, robot 10 includes 3D camera 16 at a front 17 of the robot. In this example, the front of the robot faces the direction of travel of the robot. The back of the robot faces terrain that the robot has already traversed. In this example, 3D camera 16 has a FOV 18 of 16° off of horizontal plane 20. The placement of 3D camera 16 is such that there is about a 350 millimeter (mm) range 21 before the 3D camera can detect an object proximate to the robot, and about a 410 mm range 22 before the object can detect the surface 14 on which it is traveling. In this example, the 3D camera has a sensing range 31 of about 1900 mm and can see about 750 mm above surface 14. Robot 10 also includes a LIDAR scanner 24 at its back 25. In this example, the LIDAR scanner is positioned at a back corner of the robot. The LIDAR scanner is configured to detect objects within a sensing plane 26. In this example, the sensing plane is about 200 mm above surface 14. The LIDAR scanner is not capable of detecting objects less than 200 mm above surface 14. A similar LIDAR scanner is included at the diagonally opposite front corner of the robot, which has the same scanning range and limitations.

Figure 3:
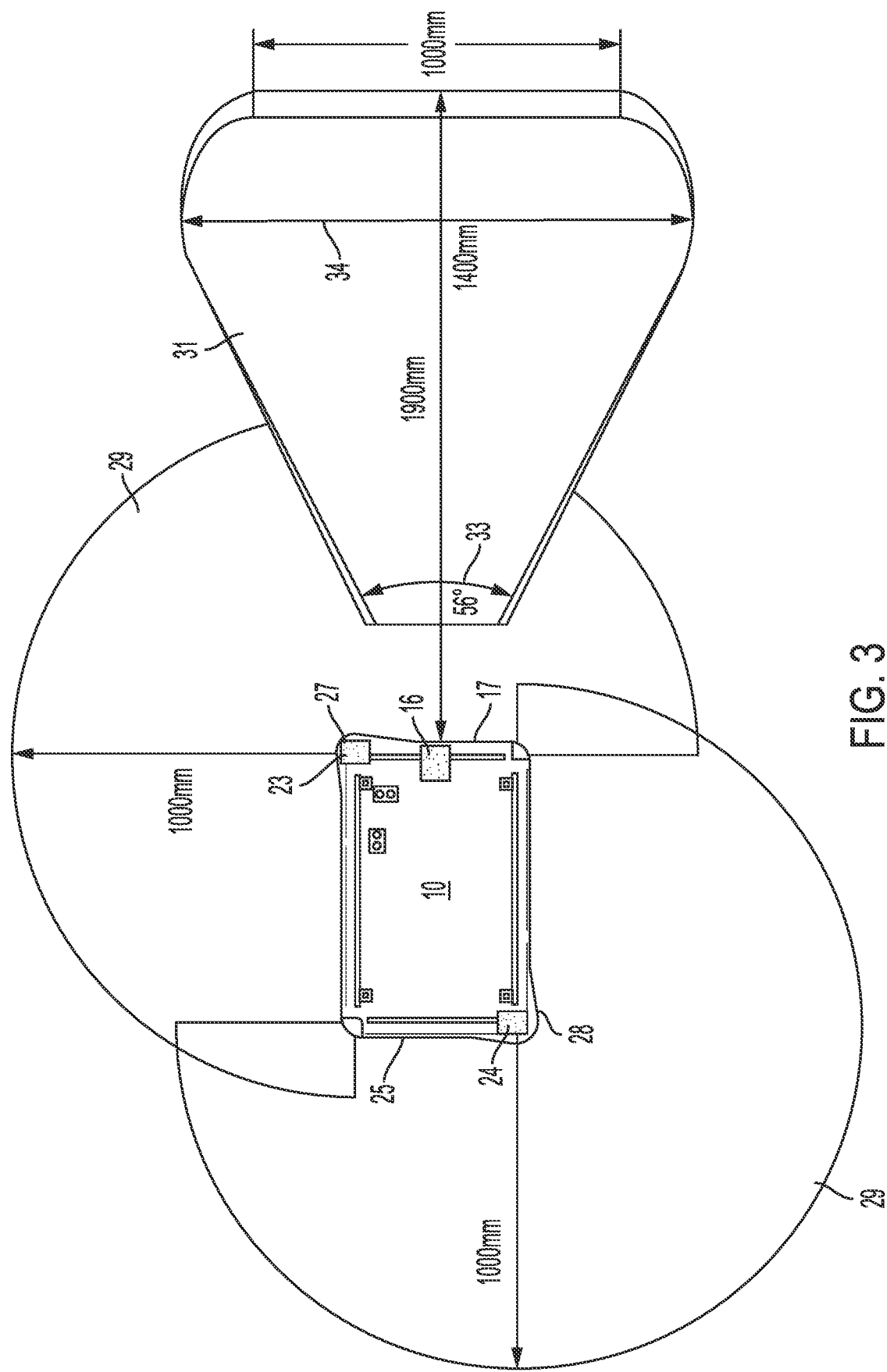
FIG. 3 is a top view of the example autonomous robot, which shows ranges of the long-range sensors included on the robot.

FIG. 3 is a top view of robot 10. LIDAR scanners 24 and 23 are located at back corner 28 and at front corner 27, respectively. In this example, each LIDAR scanner has a scanning range 29 of about 1000 mm over an arc of about 270°. In some implementations, each LIDAR scanner may have a scanning range of about 12,000 mm over an arc of about 270°. As shown in FIG. 3, the range 31 of 3D camera 16 is about 1900 mm over an arc 33 of about 56°. However, after a plane 34, the field of view of 3D camera 16 decreases from about 1400 mm to about 1000 mm at the maximum range of the 3D camera.

As is evident from FIGS. 2 and 3, in this example configuration, robot 10 includes several blinds spots, including at corners 27 and 28. In this example, a blind spot includes an area that is not visible to the long-range sensors. As a result, the long-range sensors cannot accurately detect objects within that area. For example, robot 10 cannot accurately detect objects that are less than 200 mm above surface 14. For example, robot 10 cannot accurately detect objects that are less than 350 mm from its front 17. Accordingly, short-range sensors are incorporated into the robot to sense in the areas that cannot be sensed by the long-range sensors. Thus, the short-range sensors are able to detect objects that would otherwise go undetected.

In some implementations, each short-range sensor is a member of a group of short-range sensors that is arranged around, or adjacent to, each corner of the robot. The FOVs of at least some of the short-range sensors in each group overlap in whole or in part to provide substantially consistent sensor coverage in areas near the robot that are not visible by the long-range sensors. In some cases, complete overlap of the FOVs of some short range sensors may provide sensing redundancy.

Figure 4:
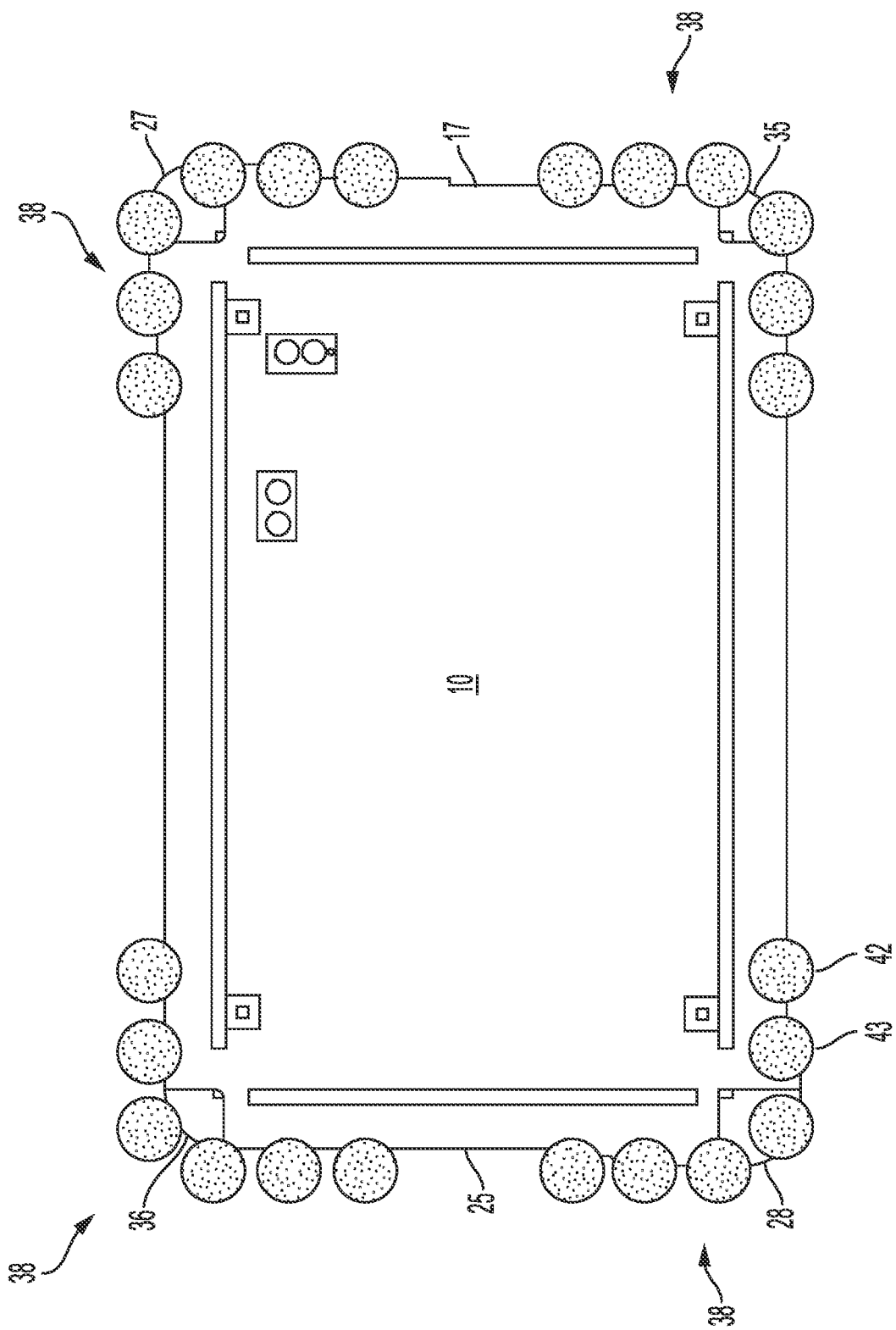
FIG. 4 is a top view of the example autonomous robot, which shows short-range sensors arranged around parts of the robot.

In the example of FIG. 4, robot 10 includes four corners 27, 28, 35, and 36. In some implementations, there are two or more short-range sensors arranged at each of the four corners so that FOVs of adjacent short-range sensors overlap in part. For example, there may be two short-range sensors arranged at each corner; there may be three short-range sensors arranged at each corner; there may be four short-range sensors arranged at each corner; there may be five short-range sensors arranged at each corner; there may be six short-range sensors arranged at each corner; there may be seven short-range sensors arranged at each corner; there may be eight short-range sensors arranged at each corner, and so forth. In the example of FIG. 4, there are six short-range sensors 38 arranged at each of the four corners so that FOVs of adjacent short-range sensors overlap in part. In this example, each corner comprises an intersection of two edges. Each edge of each corner includes three short-range sensors arranged in series. Adjacent short-range sensors have FOVs that overlap in part. At least some of the overlap may be at the corners so that there are no blind spots for the mobile device in a partial circumference of a circle centered at each corner.

Figure 5:
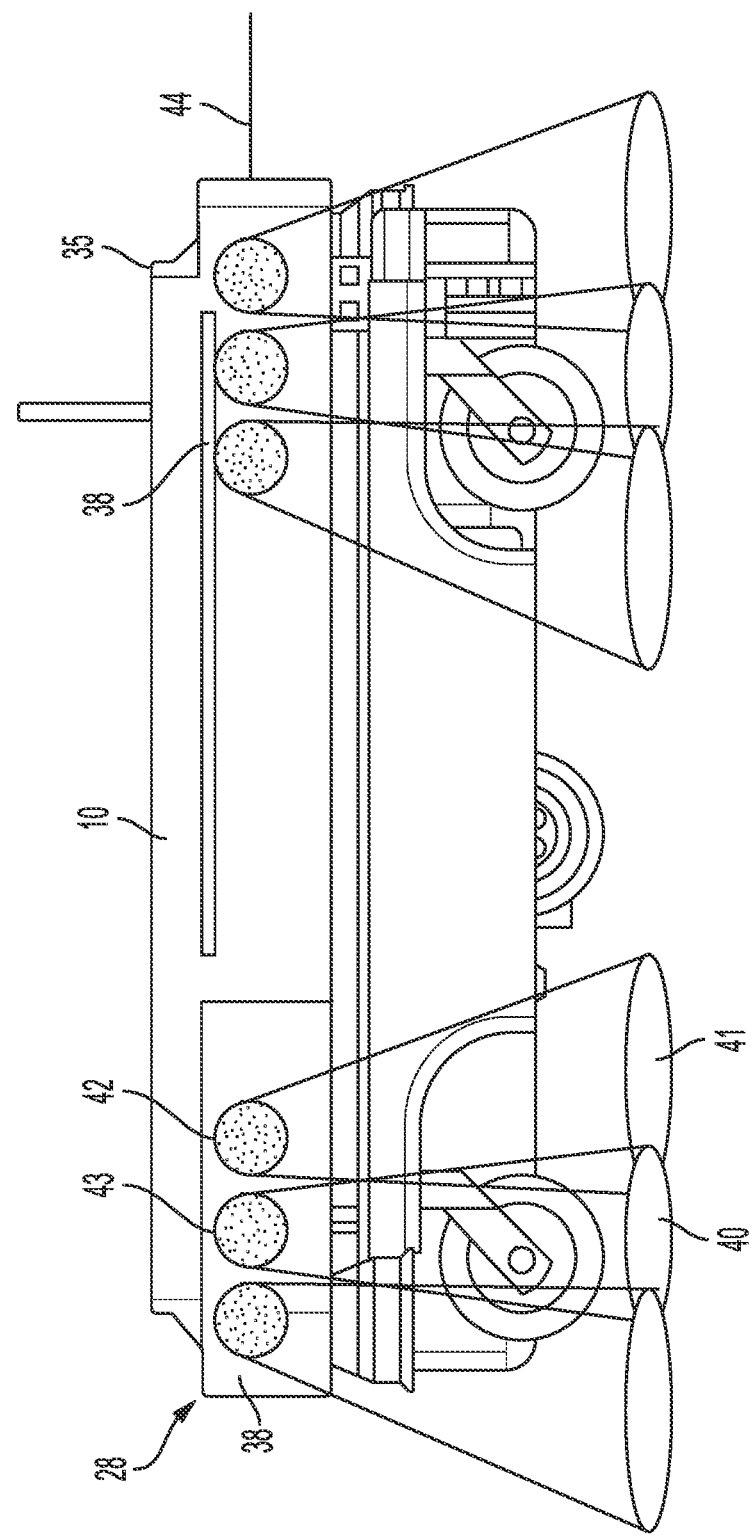
FIG. 5 is a side view of the example autonomous robot, which the shows short-range sensors arranged around parts of the robot and their fields of view.
Figure 6:
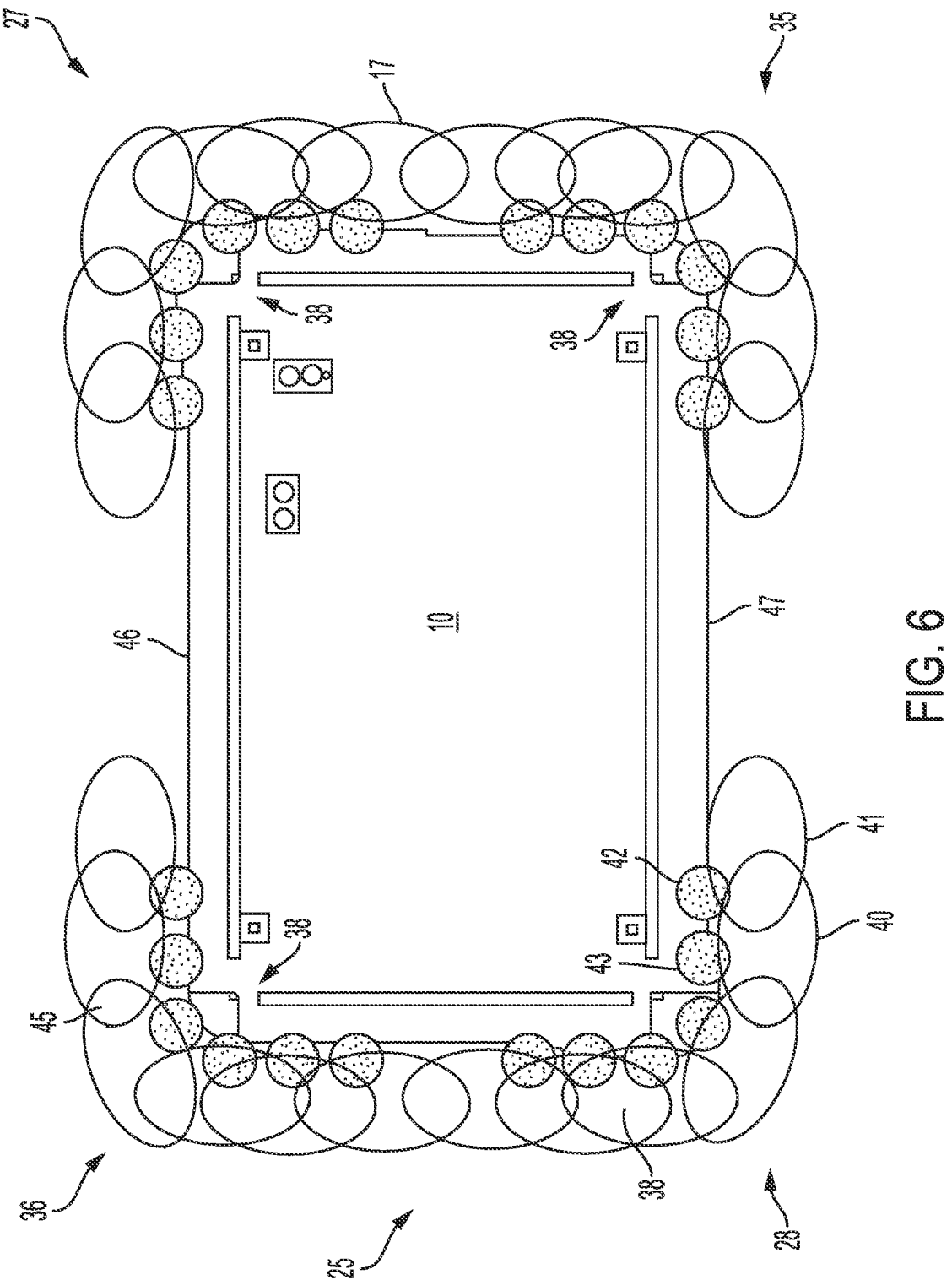
FIG. 6 is a top view of the example autonomous robot, which shows the short-range sensors arranged around parts of the robot and their fields of view.

FIGS. 1, 4, 5, and 6 show different views of the example sensor configuration of robot 10. As explained above, in this example, there are six short-range sensors 38 arranged around each of the four corners 27, 28, 35, and 36 of robot 10. As shown in FIGS. 5 and 6, FOVs 40 and 41 of adjacent short-range sensors 42 and 43 overlap in part to cover all, some, or portions of blind spots on the robot that are outside—for example, below—the FOVs of the long-range sensors.

Referring to FIG. 5, the short-range sensors 38 are arranged so that their FOVs are directed at least partly towards surface 14 on which the robot travels. In an example, assume that horizontal plane 44 extending from body 12 is at 0° and that the direction towards surface 14 is at −90° relative to horizontal plane 44. The short-range sensors 38 may be directed (e.g., pointed) toward surface 14 such that the FOVs of all, or of at least some, of the short-range sensors are in a range between −1° and −90° relative to horizontal plane 44. For example, the short-range sensors may be angled downward between −1° and −90° relative to horizontal plane 44 so that their FOVs extend across the surface in areas near to the robot, as shown in FIGS. 5 and 6. The FOVs of the adjacent short-range sensors overlap partly. This is depicted in FIGS. 5 and 6, which show adjacent short-range sensor FOVs overlapping in areas, such as area 45 of FIG. 6, to create combined FOVs that cover the entirety of the front 17 of the robot, the entirety of the back 25 of the robot, and parts of sides 46 and 477 of the robot. In some implementations, the short-ranges sensors may be arranged to combine FOVs that cover the entirety of sides 46 and 47.

In some implementations, the FOVs of individual short-range sensors cover areas on surface 14 having, at most, a diameter of 10 centimeters (cm), a diameter of 20 cm, a diameter of 30 cm, a diameter of 40 cm, or a diameter of 50 cm, for example. In some examples, each short-range sensor may have a sensing range of at least 200 mm; however, other examples may have different sensing ranges.

In some implementations, the short-range sensors are, or include, time-of-flight (ToF) laser-ranging modules, an example of which is the VL53L0X manufactured by STMicroelectronics®. This particular sensor is based on a 940 nanometer (nm) "class 1" laser and receiver. However, other types of short-range sensors may be used in place of, or in addition to, this type of sensor. In some implementations, the short-range sensors may be of the same type or of different types. Likewise, each group of short-range sensors—for example, at each corner of the robot—may have the same composition of sensors or different compositions of sensors. One or more short-range sensors may be configured to use non-visible light, such as laser light, to detect an object. One or more short-range sensors may be configured to use infrared light to detect the object. One or more short-range sensors may be configured to use electromagnetic signals to detect the object. One or more short-range sensors may be, or include, photoelectric sensors to detect the object. One or more short-range sensors may be, or include, appropriately-configured 3D cameras to detect the object. In some implementations, combinations of two or more of the preceding types of sensors may be used on the same robot. The short-range sensors on the robot may be configured to output one or more signals in response to detecting an object.

Signals from the short-range sensors and from the long-range sensors may be processed by a control system, such as a computing system, to identify an object near to, or in the path of, the robot. If necessary, navigational corrections to the path of the robot may be made, and the robot's movement system may be controlled based on those corrections The control system may be local. For example, the control system may include an on-board computing system located on the robot itself. The control system may be remote. For example, the control system may be a computing system external to the robot. In this example, signals and commands may be exchanged wirelessly to control operation of the robot. Examples of control systems that may be used are described herein and may include one or more processing devices, such as a microprocessor, and memory storing instructions that are executable by the microprocessor to interpret data based on signals from sensors, to determine navigational paths of the robot based on those signals, and to control the movement of the robot based on the determined navigational paths.

The short-range sensors are not limited to placement at the corners of the robot. For example, the sensors may be distributed around the entire perimeter of the robot. For example, in example robots that have circular or other non-rectangular bodies, the short-range sensors may be distributed around the circular or non-rectangular perimeter and spaced at regular or irregular distances from each other in order to achieve overlapping FOV coverage of the type described herein. Likewise, the short-range sensors may be at any appropriate locations—for example, elevations—relative to the surface on which the robot travels.

Referring to FIG. 1 for example, body 12 includes a top part 50 and a bottom part 51. The bottom part is closer to surface 14 during movement of the robot than is the top part. The short-range sensors may be located on the body closer to the top part than to the bottom part. The short-range sensors may be located on the body closer to the bottom part than to the top part. The short-range sensors may be located on the body such that a second field of each short-range sensor extends at least from 15 centimeters (cm) above the surface down to the surface. The location of the short-range sensors may be based, at least in part, on the FOVs of the sensors. In some implementations, all of the sensors may be located at the same elevation relative to the surface on which the robot travels. In some implementations, some of the sensors may be located at different elevations relative to the surface on which the robot travels. For example, sensors having different FOVs may be appropriately located relative to the surface to enable coverage of blinds spots near to the surface.

Figure 7:
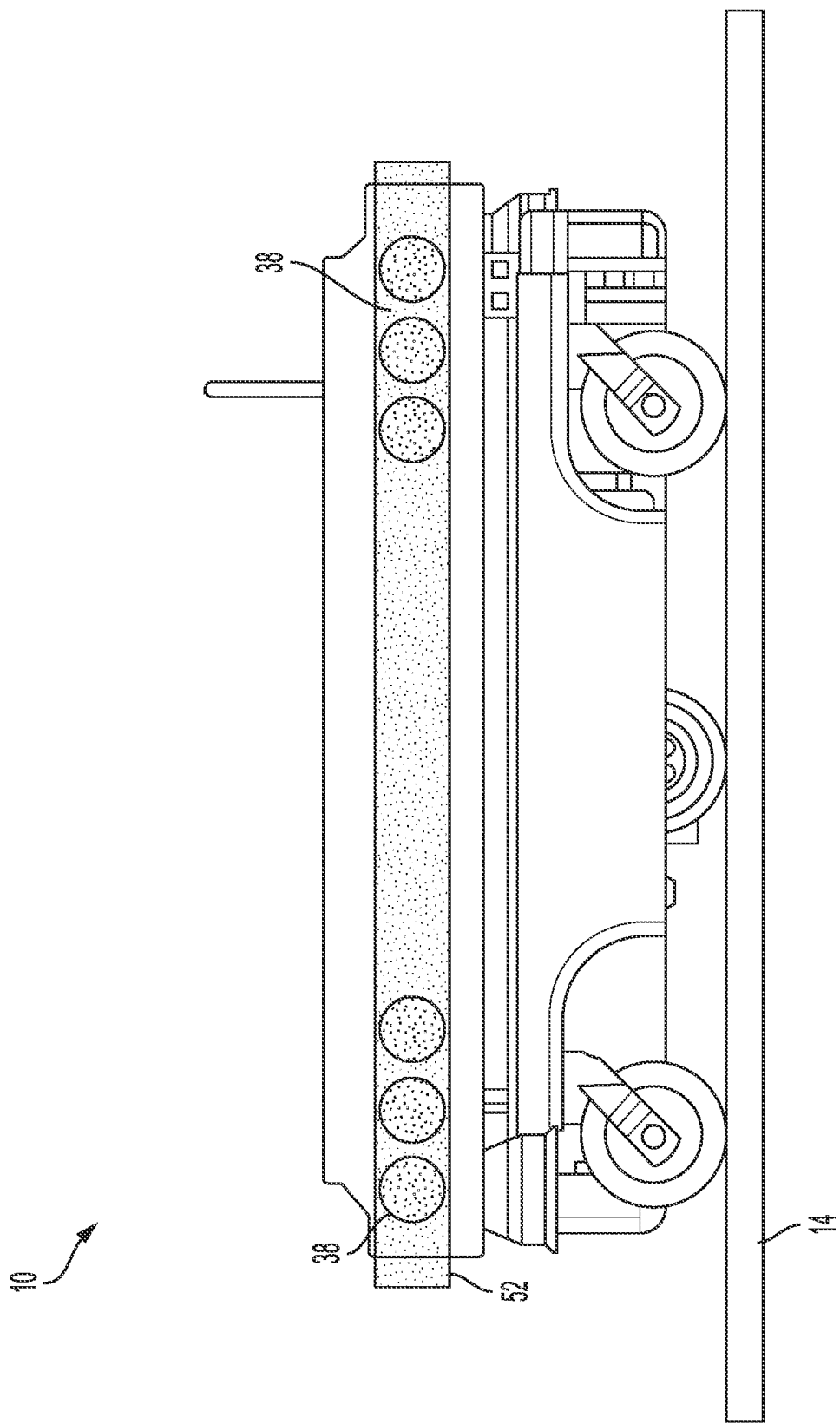
FIG. 7 is a side view of the example autonomous robot, which shows a bumper and the short-range sensors underneath or behind the bumper.

In some implementations, such as that shown in FIG. 7, robot 10 may include a bumper 52. The bumper may be a shock absorber and may be elastic, at least partially. The short-range sensors 38 may be located behind or underneath the bumper. In some implementations, the short-range sensors may be located underneath structures on the robot that are hard and, therefore, protective.

In some implementations, the direction that the short-range sensors point may be changed via the control system. For example, in some implementations, the short-range sensors may be mounted on body 12 for pivotal motion, translational motion, rotational motion, or a combination thereof. The control system may output signals to the robot to position or to reposition the short-range sensors, as desired. For example if one short-range sensor fails, the other short-range sensors may be reconfigured to cover the FOV previously covered by the failed short-range sensor. In some implementations, the FOVs of the short-range sensors and of the long-range sensors may intersect in part to provide thorough coverage in the vicinity of the robot.

The dimensions and sensor ranges presented herein are for illustration only. Other types of autonomous devices may have different numbers, types, or both numbers and types of sensors than those presented herein. Other types of autonomous devices may have different sensor ranges that cause blind spots that are located at different positions relative to the robot or that have different dimension than those presented. The short-range sensors described herein may be arranged to accommodate these blind spots.

The example robot described herein may include, and/or be controlled using, a control system comprised of one or more computer systems comprising hardware or a combination of hardware and software. For example, a robot may include various controllers and/or processing devices located at various points in the system to control operation of its elements. A central computer may coordinate operation among the various controllers or processing devices. The central computer, controllers, and processing devices may execute various software routines to effect control and coordination of the various automated elements.

The example robot described herein can be controlled, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing at least part of the robot can be performed by one or more programmable processors executing one or more computer programs to perform the functions described herein. At least part of the robot can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Any connection involving electrical circuitry that allows signals to flow, unless stated otherwise, is an electrical connection and not necessarily a direct physical connection regardless of whether the word "electrical" is used to modify "connection".

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. An autonomous device comprising:
a body for supporting weight of an object;
wheels on the body to enable the body to travel across a surface;
a camera on the body to obtain images in front of the autonomous device, the camera having first field that extends from the body; and
sensors disposed along at least part of a perimeter of the body and having a second field, the sensors being angled at least partly toward the surface so that the second field extends at least partly from the surface to at least a location below the first field, wherein the body comprises one or more corners, at least one of the corners being defined by edges that support a group of the sensors, the group of sensors having fields that overlap at least in part such that, for the at least one corner, there are no blind spots for the autonomous device in a partial circumference of a circle centered at the at least one corner.

2. The autonomous device of claim 1, wherein the second field intersects the first field.

3. The autonomous device of claim 1, wherein at least two of the sensors that are adjacent to each other have fields that overlap at least partly.

4. The autonomous device of claim 1, wherein the sensors are configured to use non-visible light to detect an object.

5. The autonomous device of claim 1, wherein the sensors are configured to use infrared light to detect an object.

6. The autonomous device of claim 1, wherein the sensors are configured to use electromagnetic signals to detect an object.

7. The autonomous device of claim 1, wherein the sensors comprise photoelectric sensors.

8. The autonomous device of claim 1, further comprising a rubber bumper along at least part of the perimeter, the sensors being underneath the rubber bumper.

9. The autonomous device of claim 1, wherein the sensors comprise proximity sensors configured to sense an object within at most 20 centimeters.

10. The autonomous device of claim 1, wherein the sensors comprise proximity sensors configured to sense an object within at most 30 centimeters.

11. The autonomous device 1, wherein the autonomous device comprises a mobile robot.

12. The autonomous device 1, wherein the sensors are angled to face the surface to produce the second field.

13. The autonomous device of claim 11, wherein the sensors are angled to face the surface to produce the second field.

14. The autonomous device of claim 1, wherein the body comprises four corners; and
wherein there are four of the sensors arranged at each of the four corners so that second fields of adjacent sensors among the four sensors overlap at least in part.

15. The autonomous device of claim 14, wherein each corner comprises an intersection of two edges, each edge of each corner comprising three of the sensors, adjacent ones of the sensors having second fields that overlap at least in part.

16. The autonomous device of claim 1, wherein the body has a non-rectangular perimeter; and
wherein the sensors are arranged along the non-rectangular perimeter so that second fields of at least some of the sensors overlap at least in part.

17. The autonomous device of claim 1, wherein the body has a curved perimeter; and
wherein sensors are arranged along the curved perimeter so that the second fields of at least some the sensors overlap at least in part.

18. The autonomous device of claim 1, wherein the body comprises a top part and a bottom part, the bottom part being closer to the surface during movement of the autonomous device than the top part; and
wherein sensors are located on the body closer to the top part than to the bottom part.

* * * * *